United States Patent [19]

Heller

[11] Patent Number: 4,483,716

[45] Date of Patent: Nov. 20, 1984

[54] POULTICE METHOD FOR EXTRACTING HAZARDOUS SPILLS

[75] Inventor: Harold L. Heller, Narberth, Pa.

[73] Assignee: The Franklin Institute, Philadelphia, Pa.

[21] Appl. No.: 429,095

[22] Filed: Sep. 30, 1982

[51] Int. Cl.³ .............................................. B08B 7/00
[52] U.S. Cl. ...................................... 137/7; 134/2; 134/4; 134/42; 210/924; 210/925
[58] Field of Search ................. 134/4, 2, 7, 38, 40, 134/42; 252/91, 88, 163, 174.25; 604/289, 290, 304, 892, 896, 897; 210/924, 925; 424/28, 61

[56] References Cited

U.S. PATENT DOCUMENTS

| | | | |
|---|---|---|---|
| 2,344,268 | 3/1944 | Rench | 252/88 |
| 3,093,592 | 6/1963 | Porcaro | 252/163 |
| 3,179,609 | 4/1965 | Morisson | 134/38 |
| 3,418,243 | 12/1963 | Hoxie | 252/154 |
| 3,549,545 | 12/1970 | Stolmeijer | 252/163 |
| 3,591,416 | 7/1971 | Johnson | 134/2 |
| 3,673,095 | 6/1972 | Archer | 252/88 |
| 4,013,594 | 3/1977 | Froehlich et al. | 252/544 |
| 4,035,148 | 7/1977 | Metzger et al. | 8/137 |
| 4,105,576 | 8/1978 | Seidenberger | 252/190 |
| 4,210,460 | 7/1980 | Seidenberger | 134/7 |
| 4,383,868 | 5/1983 | Braley | 134/7 |
| 4,401,475 | 8/1983 | Eriksson et al. | 134/7 |

FOREIGN PATENT DOCUMENTS

| | | | |
|---|---|---|---|
| 340323 | 12/1930 | United Kingdom | 134/4 |
| 890084 | 2/1962 | United Kingdom | 252/163 |
| 1200677 | 7/1970 | United Kingdom | 134/2 |

OTHER PUBLICATIONS

Hutzinger et al., *The Chemistry of PCBs*, CRC Press 1974, pp. 14–15.

Baier et al., "Universal Gelling Agent for Control of Hazardous Spills" 1975, Hazardous Materials Journal (Computer Search Abstract).

*Condensed Chemical Dictionary*, 1971, p. 857, 8th Edition, Van Nostrand Reinhold Company.

Primary Examiner—William Smith
Assistant Examiner—K. M. Hastings
Attorney, Agent, or Firm—Dann, Dorfman, Herrell and Skillman

[57] ABSTRACT

Chemicals spilled on porous surfaces may be removed therefrom by applying to the spill site a poultice in the form of a slurry or paste of finely divided particulate material dispersed in a volatile solvent in which the spilled chemical substance is soluble, allowing the solvent to be absorbed into the porous substrate. The poultice is then allowed to dry, thereby effecting a wicking action causing extraction of the chemical substance from the substrate into the poultice.

17 Claims, No Drawings

POULTICE METHOD FOR EXTRACTING HAZARDOUS SPILLS

BACKGROUND OF THE INVENTION

The present invention relates generally to a poultice method for removing chemical spills from porous surfaces such as construction materials, including concrete, soil, road beds and the like, and more particularly to a method for cleaning up spills of polychlorinated biphenyls (PCBs) and PCB-contaminated transformer oil from such surfaces.

In addition to accidental chemical spills, many instances of indiscriminate disposal of chemical wastes along road beds, in land fills and elsewhere have been reported over the last several years, and concern has grown over the potential harm to public health and the environment resulting from such occurences. Considerable effort is required in cleaning up chemical substances accidentally spilled or improperly disposed of, since the chemicals often become absorbed in the porous surfaces on which they are spilled. The situation is especially aggravated when the spilled chemical is a toxic material.

Present clean-up methods for toxic chemical spills on porous substrates frequently involve extensive excavation or destruction of the porous surface. These methods are quite expensive and not always effective. Moreover, even when the site of the spill is cleaned up, there remains the problem of disposing of the toxic chemical substance and debris associated therewith in a safe and effective manner.

Halogenated organic compounds are particularly difficult to dispose of because of the highly stable nature of the carbon-halogen bonds present therein. Compounds such as polychlorinated biphenyls (PCBs), dichlorodiphenyltrichloroethane (DDT), decachlorooctahydro-1,3,4-metheno-2H-cyclobuta-[c,d]-pentalen-2-one (Kepone®), and 2,4,5-trichlorophenoxyacetic acid, (2,4,5-T), which have been found to be persistent environmental toxins, are not only resistant to biodegradation, they cannot be degraded in a practical and effective manner by any of the well known chemical decomposition methods. In most cases, known decomposition methods such as chlorolysis, catalytic dehydrohalogenation, molten salt reactions, ozone reactions and alkali metal reduction achieve only partial dehalogenation of such compounds. Moreover, these prior art methods typically involve one or more drawbacks, such as the use of expensive reagents, extensive temperature control, inert atmospheres, complex apparatus and/or substantial energy consumption which would make it difficult to utilize these methods in disposing of halogenated organic compounds present in the porous surfaces described above.

During the past several years, there has been developed at the Franklin Research Center of the Franklin Institute, Philadelphia, Pa., a system for stripping the chlorine substituents from various halogenated organic compounds, including PCBs, thus rendering them non-toxic and readily disposable. More specifically, Pytlewski, Krevitz and Smith, in their U.S. patent application Ser. No. 158,359, filed June 11, 1980, now U.S. Pat. No. 4,337,368, disclose and claim a method for the decomposition of halogenated organic compounds, which represents a significant advance over the aforementioned decomposition methods of the prior art. The decomposition reagent used in practicing the method of Pytlewski et al. is formed from the reaction between an alkali metal, a liquid reactant, such as polyglycol or a polyglycol monalkyl ether, and oxygen. This reagent produces substantially complete dehalogenation simply by mixing it with the halogenated compound in the presence of oxygen.

In U.S. patent application Ser. No. 240,622, filed Mar. 5, 1981, now U.S. Pat. No. 4,400,522, there is described and claimed another invention by Pytlewski et al. based on the discovery that substantially complete dehalogenation of halogenated organic compounds may be carried out using a reagent produced by the reaction of an alkali metal hydroxide (rather than an alkali metal), a liquid reactant, such as a polyglycol or a polyglycol monalkyl ether, and oxygen. This decomposition reagent gives results which are comparable to those obtained with the method described in the earlier filed application of Pytlewski et al. referred to above.

The reagents of the aforesaid patent and application are collectively referred to hereinafter as NaPEG reagents, or simply NaPEG.

The development of the NaPEG reagents has made it possible to remove halogenated organic compounds from fluids contaminated therewith, as well as to decompose such compounds in concentrated form in a safe, efficient and effective manner.

SUMMARY OF THE INVENTION

The above-noted deficiencies of the prior art methods for cleaning up chemical spills from porous surfaces have been overcome in accordance with the present invention wherein a poultice is employed to effect an extraction of spilled material from a porous surface without doing damage to, or otherwise harming said surface. Briefly, the method involves applying to the site of the spill a poultice in the form of a slurry or paste of finely divided particulate material, such as clay, silica, or calcium carbonate, dispersed in a volatile solvent in which the spilled chemical substance is soluble. Upon standing, the solvent is absorbed into the surface to which it is applied and the poultice dries to form a powder. During drying, a wicking action by the solvent is produced causing extraction of the chemical substance from the substrate to the evaporating surface of the particulate material component of the poultice. The dried poultice, which is essentially the powder containing the chemical substance, is then collected and disposed of.

The term "poultice", as used herein, refers to a soft paste-like mass applied to a porous surface to remove a chemical substance therefrom.

The expression "toxic material", as used herein, refers to a material containing a poison in concentrations great enough to be hazardous to human health and the environment.

While the present process may be used on any chemical spill, it is particularly useful for cleaning up spills of chemical substances comprising toxic materials, including various halogenated organic compounds, such as PCBs and PCB-contaminated transformer oils. Moreover, in a modification of the present invention, a chemical detoxifying reagent, such as the above-mentioned NaPEG reagents, may be incorporated in the poultice to decompose the hazardous substance drawn into the poultice.

In addition to providing an efficient and effective way of cleaning up chemical spills on porous surfaces, the method of the present invention possesses other notable advantages. For example, when the chemical spill comprises a toxic material, such as the above-mentioned halogenated organic compounds, addition of a detoxifying reagent to the poultice obviates handling and disposal problems associated with such toxic materials. Further, the poultice may be kept on hand at potential spill sites and used quickly on a spill, thus reducing the time in which the affected area would be inaccessible.

DESCRIPTION OF THE INVENTION

In accordance with the present invention, it has been discovered that chemicals spilled on porous surfaces such as construction materials, including, but not limited to concrete, blacktop, brick, sand, soil, wood and the like may be extracted therefrom using a poultice technique. The poultice of the present invention typically consists of a slurry or paste composed of finely divided particulate material dispersed in a volatile solvent.

The poultice material of the present invention may be prepared from many types of particulate materials and solvents. Suitable particulate materials include mineral powders such as clay (sepiolite or attapulgite), ground silica, pumice, calcium carbonate or mixtures thereof. Cellulosic powders such as mechanically comminuted purified wood pulp and wood flour may also be used effectively as a poultice component. Use of finely divided particulate materials avoids the problem of shrinkage encountered when a material such as paper pulp is used in making the the poultice. Also, use of a finely divided particulate material is important to the wicking action which occurs during drying of the poultice. This thermodynamic driving force is due to the combined effect of the porosity and capillarity of the poultice and the porosity and capillarity of the porous substrate from which the spilled chemical is being removed. The porosity of the poultice should be less than or equal to the porosity of the substrate and the capillarity of the poultice should be greater than or equal to the capillarity of the substrate. While the porosity and capillarity of the poultice relative to the substrate may vary depending on the specific poultice constituents selected, substrate and chemical spilled, it is the combined effect of porosity and capillarity which give rise to the wicking action which occurs during drying of the poultice. The suitability of a given poultice for treating a particular spill may be easily determined by trial.

Various organic solvents or solvent/water mixtures may be used as the solvent component of the poultice. In general, the choice of a particular solvent will depend on the nature of the chemical to be removed from the porous surface. Primarily, the solvent chosen as the poultice component must be capable of extracting the spilled material. For instance, where the spilled chemical is a halogenated organic compound, e.g., PCBs, the use of acetone, or other ketones, as the solvent has been found to produce particularly good results.

The relative proportions of poultice components may vary, depending on the specific particulate material and solvent selected, the principal criterion being that its proportions be selected so as to give a poultice having a paste-like consistency. The optimum proportions may be easily determined by trial.

In order to achieve removal of a spilled chemical from a porous substrate in accordance with this invention, the appropriate poultice components are blended into a slurry or paste and then applied to the site of the spill in sufficient quantity that the porous surface becomes saturated with the solvent component of the poultice. The site may optionally be covered with a polyethylene sheet (e.g. for approximately 30 minutes) to ensure saturation of the surface with solvent by reducing evaporation of the solvent. The saturated porous surface is then allowed to dry. Drying of the poultice provides the thermodynamic driving force or wicking action which transports the solvent containing the spilled chemical therein from the porous surface into the particulate material component of the poultice. The dried poultice containing the spilled chemical therein serves as a sacrificial surface that can be easily removed from the spill site and discarded.

When the spilled chemical is a toxic material, handling problems will exist with regard to both the removal and disposal of the dried poultice containing the hazardous chemical. As previously mentioned, such situations may be handled in a safe, effective and efficient manner by including in the poultice a decomposition or detoxifying reagent which will specifically react with the toxic material.

According to a preferred embodiment of the present invention, a NaPEG reagent is added to the poultice in order to detoxify halogenated organic compounds extracted from a porous surface into the poultice. As previously noted, NaPEG reagents include a family of chemical derivatives of alkali metal (or alkali metal hydroxide), liquid reactants, such as polyethylene glycol and oxygen. These reagents are produced from relatively low cost raw materials without significant manufacturing problems.

The reaction for producing the NaPEG reagent proceeds spontaneously at room temperature simply by mixing the reactants in an open reaction vessel, preferably with stirring. It is unnecessary to bubble oxygen or air into the reaction mixture, though this will accelerate the reaction. No temperature control or specialized equipment is required for carrying out the reaction. If desired, the reaction mixture may be heated to accelerate the rate of reaction. For example, a reagent formed from sodium and polyethylene-glycol having an average molecular weight of 400 is preferably prepared by heating of the reaction mixture in air to a temperature in the range of about 50° C. to about 80° C., which provides a satisfactory reaction rate. Upon heating, the reaction becomes exothermic and the temperatue of the reaction mixture rises to near or above the melting point of the sodium, which is 97.6° C. With the rise in temperature, the sodium becomes molten and reaction with the liquid ensues. Reactions involving alkali metal hydroxides are considerably less exothermic than those involving the alkali metals.

Additional details of the procedures for preparing the NaPEG ® reagents are set forth in the aforementioned U.S. Pat. No. 4,337,368 and patent application Ser. No. 240,622, and the entire disclosures thereof are incorporated by reference herein, as though set forth in full in the present disclosure.

NaPEG may be incorporated into the poultice by mixing it with the solvent component of the poultice prior to addition of the finely divided particulate material. However, the order of mixing of the components is not essential to practicing the present invention and NaPEG may be incorporated into a poultice by any other convenient method. NaPEG is readily mixed with the other poultice components to form a paste. The amount of NaPEG, or other decomposition reagent incorporated in the poultice, may vary over a wide range and will normally depend upon the surface area to be treated. The mole ratio of NaPEG to halogenated organic substance should be 5 to 1, or greater. The concentration of contaminant at the spill site may be determined by analytical procedures well known to those skilled in the art.

As disclosed in the aforementioned patent and application the by-products of the detoxification reaction are relatively non-toxic and safe to handle, the principal ones being sodium chloride and various oxygenated derivatives of the starting halogenated organic substance.

As previously mentioned, the solvent chosen as the poultice constituent will depend on the solubility characteristics of the spilled chemical. In addition, where the spilled chemical is toxic and a detoxifying reagent is used, the selected solvent must be compatible with the detoxifying reagent. The expression "compatible solvent", as used herein, refers to any solvent which does not adversely affect the reactivity of the detoxifying reagent, or otherwise interfere with its function. Thus, if a NaPEG reagent is added to the poultice, ketones may not be used as the solvent, as they react with the NaPEG reagent in such a way as to interfere with its dehalogenating function. Suitable compatible solvents for use in connection with NaPEG reagents include polar solvents such as alcohols and ethers, e.g., tetrahydrofuran. Likewise, non-polar solvents, such as hexane, toluene and xylene are compatible with NaPEG reagents added to the poultice.

Similarly, where the spilled chemical is toxic and a detoxifying reagent is used, the finely divided particulate material must also be compatible with the detoxifying reagent. For instance, if a NaPEG reagent is added to the poultice, mineral powders comprised of or containing silica particles such as fumed silica may not be used as the finely divided particulate material, since silica particles react with the NaPEG reagent in such a way as to interfere with its dehalogenating function.

The poultice may further contain a binding agent such as cellulosic fibers. The addition of a binding agent helps to prevent premature cracking and drying of the poultice powder. It is believed that premature cracking interferes with the wicking action by which the solvent containing the spilled chemical dissolved therein is transported from the porous substrate into poultice. If clay is a major constituent of the poultice, mineral powders in platelet form, such as vermiculite, provide an excellent binding material.

The poultice may also contain a gelling agent. Thixotropic gelling agents, which liquefy when agitated, are particularly suited for inclusion in the poultice, in that they facilitate application of the poultice to the contaminated porous substrate and further prevent flowing of the poultice. Examples of useful thixotropes are bentonite, chemically modified clay and hydrogenated castor oil.

When solvent/water mixtures are used in the poultice, non-ionic wetting agents may be added to improve the solubility of the contaminants in the poultice.

The time during which the poultice is in contact with the surface being treated must be sufficient for thorough drying of the poultice (e.g. approximately 24 hours). The poultice may be tested periodically to determine whether or not adequate drying has occurred.

The presently preferred manner and process of making and using the invention, which embodies the best mode contemplated by the inventor for carrying out the invention, will now be described.

A mixture of NaPEG 400 (i.e. formed from sodium, polyethylene glycol having a molecular weight of 400, and oxygen), in the proportion of 60 parts NaPEG to 40 parts toluene by weight is added to a dry clay/vermiculite powder to form a wet paste. The paste is applied over a PCB or PCB-contaminated dielectric fluid spilled onto a concrete surface. The paste is covered with a polyethylene sheet for approximately 30 minutes to reduce solvent evaporation. The polyethylene sheet is then removed, and the solvent is allowed to evaporate. The powder is left in place until the PCBs are destroyed and then collected for disposal. Alternatively the dried powder may be collected immediately and stored, allowing the PCB destruction to take place in the storage container. Substantially complete PCB destruction normally takes several days. The powder may therefore be tested periodically to determine whether or not substantial PCB destruction has occurred.

While particular embodiments of the present invention have been described hereinabove, it is not intended to limit the invention to such embodiments, but changes and/or additions may be made therein and thereto without departing from the scope and spirit of the invention as set forth in the following claims.

What is claimed is:

1. A process for removing a chemical substance from a porous substrate, said porous substrate comprising a construction material having said chemical substance absorbed therein, which comprises:
    (a) applying to said porous substrate a poultice in the form of a paste comprising a finely divided particulate material dispersed in a volatile solvent in which said chemical substance is soluble, whereby said solvent is transferred from said poultice into said porous substrate;
    (b) allowing said poultice to remain in contact with said porous substrate for a time sufficient for substantially complete evaporation of said solvent to occur thereby effecting extraction of said chemical substance from said porous substrate into said particulate material component of said poultice by capillary flow.

2. The process of claim 1 including the step of removing said poultice containing said chemical substance from said substrate.

3. The process of claim 1 wherein said finely divided particulate material is a mineral powder selected from the group consisting of clay, ground silica, pumice, calcium carbonate or mixtures thereof.

4. The process of claim 1 wherein said finely divided particulate material is a cellulosic powder.

5. A process for removing a toxic halogenated organic compound from a porous substrate, said porous substrate comprising a construction material having the organic compound absorbed therein, which comprises:
    (a) applying to said porous substrate a poultice in the form of a paste comprising a finely divided particulate material dispersed in a volatile solvent in which the organic compound is soluble, whereby said solvent is transferred from said poultice into said porous substrate;
    (b) allowing said poultice to remain in contact with said porous substrate for a time sufficient for evaporation of said solvent to occur thereby effecting extraction of said organic compound from said porous substrate into said particulate material component of said poultice by capillary flow.

6. The process of claim 5 wherein said volatile solvent is a ketone.

7. The process of claim 6 wherein said ketone is acetone.

8. The process fo claims 6 or 7 wherein the halogenated organic compound is a polychlorinated biphenyl.

9. A process for removing a toxic halogenated organic compound from a porous substrate which comprises:

(a) applying to said porous substrate a poultice in the form of a paste comprising a finely divided particulate material dispersed in a volatile solvent in which said halogenated orhanic compound is soluble and a detoxifying reagent for said halogenated organic compound, whereby said solvent and detoxifying reagent are transferred from said poultice into said porous substrate;

(b) allowing said poultice to remain in contact with said porous substrate for a time sufficient for evaporation of said solvent to occur thereby effecting extraction of said halogenated organic compound from said porous substrate into said particulate material component of said poultice by capillary flow and detoxification of said halogenated organic compound.

10. The process of claim 9 wherein the detoxifying reagent is a dehalogenation reagent comprising the product of the reaction of a first reactant selected from the group consisting of an alkali metal or an alkali metal hydroxide, a second reactant having the general formula $$HO-[(C)_x-O]_n-R,\ \ \text{with}\ R_1,\ R_2$$

wherein R is hydrogen or lower alkyl, $R_1$ and $R_2$ are the same or different and are selected from the group consisting of hydrogen, unsubstituted or substituted lower alkyl, unsubstituted or substituted cycloalkyl having from 5 to 8 carbon atoms, and unsubstituted or substituted aryl, n has a value from about 2 to about 400 and x has value of at least 2, and oxygen as a third reactant.

11. The process of claim 10, wherein (i) said dehalogenating reagent is formed from a first reactant selected from the group consisting of lithium, sodium, potassium, or the hydroxides of said metals, or mixtures of said metals or said hydroxides, a second reactant having the formula set forth in claim 10 wherein $R_1$ and $R_2$ are hydrogen and x is 2, and (ii) said toxic halogenated organic compound is selected from the group consisting of hexachlorocyclohexane, hexachlorobenzene, trichlorobenzene, tetrachlorobenzene, dichlorophenol, pentachlorophenol, dichlorodiphenyltrichloroethane, decachlorooctahydro-1,3,4-metheno-2H-cyclobuta-[c,d]-pentalen-2-one and polychlorinated biphenyl.

12. The process of claim 11 wherein said first reactant is sodium and said second reactant is polyethylene glycol.

13. The process of claim 12 wherein said toxic halogenated organic compound is polychlorinated biphenyl.

14. The process of claim 11 wherein said volatile solvent is a polar solvent.

15. The process of claim 14 wherein said volatile solvent is selected from the group consisting of alcohols or tetrahydrofuran.

16. The process of claim 11 wherein said volatile solvent is a non-polar solvent.

17. The process of claim 16 wherein said non-polar solvent is selected from the group consisting of hexane, toluene or xylene.

* * * * *